(12) United States Patent
Deschner

(10) Patent No.: US 8,839,566 B2
(45) Date of Patent: Sep. 23, 2014

(54) BEARING SITE FOR A REDIRECTING ELEMENT

(75) Inventor: Klaus Deschner, Burgebrach (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 412 days.

(21) Appl. No.: 12/993,466

(22) PCT Filed: May 20, 2009

(86) PCT No.: PCT/EP2009/056182
§ 371 (c)(1),
(2), (4) Date: Dec. 1, 2010

(87) PCT Pub. No.: WO2009/141401
PCT Pub. Date: Nov. 26, 2009

(65) Prior Publication Data
US 2011/0078957 A1    Apr. 7, 2011

(30) Foreign Application Priority Data

May 21, 2008    (DE) .......................... 10 2008 024 742

(51) Int. Cl.
*B60J 5/04*    (2006.01)
(52) U.S. Cl.
CPC .......... *B60J 5/0416* (2013.01); *E05Y 2800/682* (2013.01); *E05Y 2600/626* (2013.01); *E05Y 2800/40* (2013.01); *E05Y 2600/60* (2013.01); *E05Y 2201/668* (2013.01); *E05Y 2600/00* (2013.01); *E05Y 2201/654* (2013.01)
USPC .................... 49/502; 49/348; 49/352; 49/372

(58) Field of Classification Search
USPC ............. 49/352, 349, 348, 502; 296/146, 201
See application file for complete search history.

(56) References Cited

U.S. PATENT DOCUMENTS 6,227,993 B1    5/2001    Medebach
6,758,013 B2 *  7/2004    Staser et al. .................... 49/352
(Continued)

FOREIGN PATENT DOCUMENTS

DE    199 15 151 A1    9/2000
DE    202 10 370 U1    10/2002
(Continued)

OTHER PUBLICATIONS

International Search Report, dated Jul. 8, 2004, corresponding to PCT/EP2004/003381, 6 pages.
(Continued)

*Primary Examiner* — Katherine Mitchell
*Assistant Examiner* — Catherine A Kelly
(74) *Attorney, Agent, or Firm* — Christie, Parker & Hale, LLP

(57) ABSTRACT

A window lift assembly for a motor vehicle, with a component on which a bearing site is provided for a redirecting element, in particular for a cable pulley or a deflecting piece, is provided. The redirecting element is arranged beside the component at the bearing site along a connecting axis pointing from the redirecting element to the component and the redirecting element redirects a driving force for adjusting a window pane of the motor vehicle. The redirecting element is mounted on the component along the connecting axis and the connecting axis forms a physical axis for mounting the redirecting element. The bearing site supports the redirecting element on an outer surface rimming the redirecting element at least in a direction vertical to the connecting axis, and for supporting the redirecting element the bearing site includes at least one portion protruding from the component.

24 Claims, 10 Drawing Sheets

(56) References Cited

U.S. PATENT DOCUMENTS

| | | | |
|---|---|---|---|
| 7,121,044 B2 * | 10/2006 | Santaolalla Gil et al. | 49/352 |
| 7,882,658 B2 * | 2/2011 | Staser et al. | 49/352 |
| 2005/0279024 A1 | 12/2005 | Koellner et al. | |
| 2006/0196122 A1 * | 9/2006 | Urieta et al. | 49/502 |
| 2009/0051193 A1 * | 2/2009 | Hernandez et al. | 296/146.2 |
| 2009/0188167 A1 | 7/2009 | Maruyama et al. | |
| 2011/0010999 A1 * | 1/2011 | Broadhead et al. | 49/352 |

FOREIGN PATENT DOCUMENTS

| | | | |
|---|---|---|---|
| DE | 202 13 813 U1 | | 11/2003 |
| DE | 103 15 805 A1 | | 10/2004 |
| DE | 20 2006 018 071 U1 | | 5/2008 |
| EP | 1 090 788 A1 | | 4/2001 |
| EP | 1 090 788 B1 | | 4/2001 |
| JP | 07-180427 A | | 7/1995 |
| JP | 8-4412 | | 1/1996 |
| JP | 2007-315101 A | | 12/2007 |
| WO | WO 2004/087450 A1 | | 10/2004 |
| WO | WO 2007/142128 A1 | | 12/2007 |
| WO | WO 2008/061906 A2 | | 5/2008 |

OTHER PUBLICATIONS

English translation of International Preliminary Report on Patentability dated Dec. 6, 2010 for corresponding PCT Application No. PCT/EP2009/056182, 7 sheets.

European Office Action dated Apr. 4, 2012 for Application No. 09 749 891.9, 5 sheets.

English translation of the relevant parts of the European Office Action dated Apr. 4, 2012 for Application No. 09 749 891.9.

International Search Report, dated Sep. 17, 2009, corresponding to PCT/EP2009/056182.

Japanese Examination Report for Application No. 2011-509987, dated May 8, 2013 (2 pages) and English translation (2 pages).

* cited by examiner

BEARING SITE FOR A REDIRECTING ELEMENT

CROSS-REFERENCE TO A RELATED APPLICATION

This application is a National Phase Patent Application of International Patent Application Number PCT/EP2009/056182, filed on May 20, 2009, which claims priority of German Patent Application Number 10 2008 024 742.1, filed on May 21, 2008.

BACKGROUND

This invention relates to a bearing site for a redirecting element, in particular for a cable pulley or a deflecting piece, which bearing site is provided on a component of a window lift assembly of a motor vehicle and to a guide rail of a window lift assembly.

Redirecting elements, such as cable pulleys or deflecting pieces or deflecting slides, regularly are used on components of a window lift assembly, in order to redirect a driving force for adjusting a window pane of a motor vehicle door. Usually, Bowden cables are used and deflected. The same transmit the driving force from a drive to the window pane and to carriers connected therewith, in order to raise or lower the window pane inside the motor vehicle door. Preferably, the redirection is effected by means of cable pulleys provided on guide rails of the window pane, which are attached to the guide rails so as to be rotated about an axis of rotation. For the rotatable attachment, various fastening elements such as screws or stepped pins are used, which are guided centrally through the cable pulley and about whose central axis the cable pulley can be rotated. As an alternative, deflecting pieces regularly are used, through which or over which a Bowden cable is guided.

As a result of the relatively large forces acting on the cable pulley or the deflecting piece, e.g. a bending moment as a result of the driving forces or as a result of a movement of the window pane, the same must safely be absorbed by the fastening element and be introduced into the guide rail or an assembly carrier of a motor vehicle door connected therewith. Therefore, the fastening elements on the one hand usually are designed correspondingly stable and on the other hand a correspondingly reinforced receptacle or fastening point is provided for the fastening element on the guide rail or assembly carrier.

However, related large diameters for the receptacle or the fastening point, so as to achieve the desired or necessary strengths, involve a high expenditure of material. Especially with an increased bending load of the cable pulley vertical to its axis of rotation, this means that a lasting function free from failure can only be ensured by using extremely stable fastening elements and by corresponding material thicknesses in the region of the fastening element. At the same time, however, this also involves increased costs for the manufacture and assembly of such window lift assembly with a redirecting element.

SUMMARY

Therefore, it is the problem underlying the invention to provide a bearing site for a redirecting element, which overcomes or at least minimizes said disadvantages and improves the mounting of a redirecting element on a component of a window lift assembly.

According to an exemplary embodiment of the invention, a bearing site for a redirecting element, in particular for a cable pulley or a deflecting piece, is provided on a component of a window lift assembly of a motor vehicle, wherein the redirecting element is arranged at the bearing site on a component along a connecting axis pointing from the redirecting element to the component and the redirecting element redirects a driving force for adjusting a window pane of the motor vehicle. In accordance with the invention, the bearing site supports the redirecting element on an outer surface rimming the redirecting element at least in a direction vertical to the connecting axis.

In the case of using a cable pulley as redirecting element this means for example that the cable pulley is radially supported by the bearing site on at least one region of its circumference. If an additional fastening element, such as a screw, a rivet or a bolt, is provided for attachment of the redirecting element, the same can exclusively be utilized for locking in direction of the connecting axis. The bearing or support, respectively, of the redirecting element, in order to absorb the forces acting on the redirecting element due to the redirection of the driving force, can be accommodated directly via the bearing site.

Correspondingly, a possible fastening point for a fastening element on the component must only be designed for small forces. In other words, the bearing site provided and/or present on a circumferential region of the redirecting element substantially can support the redirecting element alone, and possibly only one additional locking means is separately realized in direction of the connecting axis.

In the following, however, the connecting axis does not necessarily designate the axis of a connecting or fastening element for mounting the redirecting element on the component. Rather, the connecting axis basically illustrates the mounting direction of the redirecting element in or on the bearing site relative to the component. Depending on the redirecting element used, a "support" or abutment of the redirecting element on the component will also be provided in direction of the connecting axis. Apart from this, however, the bearing site in accordance with the invention provides a support vertical to this connecting axis.

For the bearing site in accordance with the invention, it therefore is irrelevant whether the surfaces of the redirecting element and of the component facing each other after the assembly are located parallel to each other along the connecting axis; what is essential is the support on at least one outer surface of the redirecting element vertical to the connecting axis.

For an optimized accommodation or support of the redirecting element in or on the bearing site it is regarded as advantageous that the bearing site supports the redirecting element on opposed regions of the redirecting element. Consequently, it is preferred when the bearing site supports the redirecting element in several directions and thus is also designed for a plurality of load cases or different forces acting on the redirecting element. For this purpose, a support on opposed regions can be provided by at least two opposed, protruding supporting portions of the bearing site.

Furthermore, it is preferred that the bearing site supports the redirecting element at least in one direction of action of the driving force, from or in which the redirecting element redirects the driving force. In this respect, in a cable pulley as redirecting element with a Bowden cable used for transmitting the driving force, a radial support of the cable pulley would each be provided in direction of the cable or Bowden cable.

Alternatively or in addition, the bearing site supports the redirecting element at least in a direction in which a resultant force acts on the redirecting element due to the redirection of the driving force. In a cable pulley or a deflecting piece of a window lift assembly, the driving force ideally acts in one plane only, e.g. vertical to an axis of rotation of the cable pulley. In at least one direction, in which one of these force components acts, the redirecting element advantageously is supported by the bearing site. If the redirection of the driving force furthermore is effected by an angle smaller than 90 degrees, there will always be a resultant force which both with a redirection from the first into the second direction of action and with a redirection from the second into the first direction of action points in a corresponding direction. In this direction, a support by the bearing site then is preferred. For example, this can be the direction of the longitudinal extension of a guide rail on which the redirecting element is mounted.

To provide e.g. a fit for a redirecting element, in particular an immovable deflecting piece, or an improved protection of the redirecting element in or on the bearing site, the same can be formed as a receptacle which at least partly surrounds the redirecting element. There can also be realized a complete casing, into which the redirecting element is introduced for mounting on the component, for example along the connecting axis. In this case, however, it is not absolutely necessary that the redirecting element supports on all surrounding surfaces of the receptacle. Rather, one or more supporting portions can be provided at individual points of the receptacle.

In a further exemplary configuration variant, the bearing site can be formed such that the redirecting element is retained in the bearing site by means of a clamping connection. For this purpose, e.g. resilient latching elements can be used, which engage in or enclose the redirecting element, after the redirecting element has been mounted on the component of the window lift assembly. In the case of a cable pulley, this clamping connection thus might provide for locking parallel to the axis of rotation, alternatively or in addition. This means that the cable pulley might be locked axially in this way.

For the safe and simple support of the redirecting element, the bearing site preferably includes at least one supporting portion protruding from the component, on or by which the redirecting element is supported. When a redirecting element is supported by the bearing site in several directions in space, there can also be provided a plurality of protruding supporting portions or one continuous supporting portion surrounding the redirecting element.

A protruding supporting portion of the bearing site can each be formed as a pin protruding from the component (e.g. vertically), on which the redirecting element each is supported only at certain points. It is preferred, however, that the bearing site forms at least one abutment surface on the at least one protruding supporting portion, on which the redirecting element is supported. In this way, an optimized introduction of force is possible from the redirecting element to the supporting bearing site.

In this connection, it is therefore also regarded as advantageous when the abutment surface and/or the at least one protruding supporting portion follows a contour of a region which is part of the outer surface of the redirecting element. The abutment surface or the protruding supporting portion hence is adapted to the course or the shape of the corresponding outer surface, and for example is curved.

To be able to more efficiently transmit the force introduced into an abutment surface of the bearing site to the component, it is preferred that the bearing site includes a supporting structure. This supporting structure adjoins the abutment surface or the at least one protruding portion and extends in a direction which faces away from the redirecting element. For this purpose, the supporting structure can be formed integrally with the abutment surface or the at least one protruding portion or be fabricated separate therefrom. It is essential that the supporting structure absorbs the at least one force, which acts as a result of the redirection of the driving force from the redirecting element to the abutment surface or the protruding portion. For a supporting structure optimized in terms of the flux of force, it is regarded as particularly advantageous in accordance with a development when the supporting structure is conically tapered from the abutment surface.

A further essential aspect of the present invention is the use of a base element to be mounted separately to the bearing site, at least one portion of which is arranged between the redirecting element and the support of the bearing site provided vertical to the connecting axis. Consequently, a portion of the base element is located for example between the redirecting element and the supporting portion of the bearing site protruding from the component. Thus, the base element provides e.g. a receptacle or bushing, initially a support and/or bearing of the redirecting element, and then supports itself on the bearing site. In this way, a sandwich construction can also be realized when the base element and the redirecting element advantageously have different material properties and then are combined.

In addition, the redirecting element preassembled with the base element can be mounted on the component of the window lift assembly. Especially with regard to a cable pulley as rotatable redirecting element, the use of a base element furthermore is ascribed the advantage that both a radial and an axial bearing can be provided by the base element. The base element thus can form e.g. a pivot or journal pin, onto which a cable pulley is put and which is machined such that a rather friction-free rotation of the cable pulley is possible. A separate and expensive machining or adjustment of guiding or contact surfaces on the component of the window lift assembly itself, e.g. on a protruding supporting portion of the bearing site or a fastening point, hence is not necessary.

Advantageously, the redirecting element supports on the bearing site via the base element vertical to the connecting axis. In connection with the use of a base element and a cable pulley as redirecting element it is therefore also conceivable that only portions of the base element directly rest against the previously mentioned supporting portions or the abutment surface. Supporting then is effected radially by means of the base element in combination with the supporting portions of the bearing site.

In one exemplary variant, the bearing site advantageously is configured such that the bearing site supports the redirecting element and/or the base element in such a way that the bearing site limits or prevents tilting of the redirecting element and/or the base element in a direction parallel to the connecting axis. In other words, a protruding supporting portion enclosing the redirecting element for example ensures that the redirecting element cannot be tilted relative to the component or can only be tilted by a defined amount, after it has been mounted on the component. The bearing site hence includes an anti-tilt protection for the redirecting element and/or the base element.

For this purpose, a surrounding supporting portion possibly can also be provided with a stop surface, by means of which the redirecting element and/or the base element is prevented from tilting. Likewise, the base element or the redirecting element alone or the base element and the redirecting element together can rest against the abutment surface only after a tolerable tilting and can be prevented from tilting further. For example, such tilting can be tolerable when it is still ensured that the redirecting element performs its function. This can be the case, for example, when despite tilting by a tolerable amount a defined and low-friction or low-noise rotation of a cable pulley as redirecting element is possible, which is mounted in the bearing site via the base element.

In correspondence with the above-described anti-tilt protection of the bearing site it is of course also possible that the base element includes such anti-tilt protection. Analogously, the anti-tilt protection prevents that the redirecting element is tilted with respect to the base element by a force component acting vertical to the driving force.

In this case, as also in the above-described stop surface of the protruding portion of the bearing site, care should be taken in a rotatably mounted redirecting element, such as a cable pulley, that the anti-tilt protection does not impair the smooth running of the redirecting element. For this purpose, a lubrication can be provided for example between the stop surface and the redirecting element. It is particularly preferred, however, when a rotatable redirecting element is connected with the base element and only the base element is prevented from (further) tilting. For a rigid redirecting element, such as a so-called deflecting slide, through which or over which a Bowden cable is slidingly guided for redirection, the anti-tilt protections set forth above can, however, directly engage or rest against the redirecting element.

As already mentioned above, it is regarded as particularly advantageous when the base element is made of a different material than the bearing site. Since essential elements of a window lift assembly, such as an assembly carrier or the guide rails, usually are made of plastics, a base element made of metal, e.g. a steel collar socket, is preferred correspondingly.

Furthermore, following the above explanations with respect to a direct clamping connection between redirecting element and bearing site or the protruding supporting portion of the bearing site, such or a similar clamping connection can of course also be realized between a base element and the bearing site. The assembly hence is simplified further.

In a configuration variant of the invention with a base element, which is regarded as particularly advantageous, the base element includes an anti-rotation device. By means of the anti-rotation device, it is prevented in a redirecting element rotatably mounted for redirection of the driving force that the base element is moved along with a rotation of the redirecting element.

As anti-rotation device, the base element for example can include an integrally molded web which extends substantially vertical to an axis of rotation of the redirecting element on the base element and which is fixed in the region of the bearing site. In this way, for example, a fast and simple mounting of a preassembled assembly of cable pulley and base element can be realized and it can be ensured at the same time that the base element does not rotate together with the cable pulley. Such joint rotation should be avoided with regard to an increased friction, an undesired generation of noise or even a decisive functional impairment.

In a combination with one of the aforementioned configuration variants the web preferably is positively accommodated in a recess of the supporting structure.

To further increase the functional reliability with the bearing site of the invention, the bearing site and/or the base element preferably are formed such that the bearing site and/or the base element prevent that after assembly of the window lift assembly a Bowden cable is removed from a cable pulley as redirecting element by a force component acting vertical to the driving force. Alternatively, this "cable protection" can of course also be provided for a deflecting piece, over whose outer surface a Bowden cable is slidingly guided, e.g. in a groove.

For this purpose, the bearing site itself and/or the base element can cover a circumferential groove of a cable pulley for guiding the Bowden cable at a distance which does not exceed the thickness of the cable, and/or can have a protrusion extending radially to the cable pulley, which limits a movement of the Bowden cable parallel to the axis of rotation of the cable pulley.

Preferably, the at least one protruding supporting portion or one of the protruding supporting portions of the bearing site is formed as cable protection tab which covers the circumferential groove of the cable pulley.

Furthermore, in one exemplary configuration variant the bearing site is expanded such that it includes a Bowden cable support which is formed for defined guidance of a Bowden cable towards the redirecting element or away from the redirecting element. In other words, the bearing site of this variant includes a Bowden cable support which guides the Bowden cable towards the redirecting element or away from the redirecting element. For this purpose, for example, at least one web or strip is molded to the bearing site or to a protruding supporting portion of the bearing site.

Alternatively, in a separately mountable Bowden cable support the bearing site preferably is designed such that the Bowden cable support can be attached to a region of the bearing site provided for this purpose.

To be able to absorb the relatively high forces via the bearing site, e.g. during an adjustment of the window pane, and nevertheless avoid that the protruding supporting portion itself must be designed too massive, reinforcing ribs are provided at the bearing site in accordance with a development of the invention.

These reinforcing ribs then are preferably molded to at least one of the protruding supporting portions and/or extend in a direction of action of the driving force. Advantageously, a plurality of reinforcing ribs is provided.

In addition, the individual reinforcing ribs then have different lengths, wherein the lengths depend on the forces acting on the reinforcing ribs as a result of the redirection of the driving force from the redirecting element to the reinforcing ribs. In other words, a reinforcing rib is formed longer and hence better for force dissipation, when usually a greater force acts on the same.

Although in the above-described configuration variants the bearing site of the invention always can also be formed as a separate component of the window lift assembly, it preferably is molded to an assembly carrier or to a guide rail of the window lift assembly, in order to minimize costs and effort.

A guide rail of a window lift assembly of a motor vehicle regularly includes a track along which a carrier can be shifted, in order to adjust a window pane connected with the carrier. In a bearing site of the invention, which is provided on such guide rail, it is preferred in a supporting structure adjoining an abutment surface or a protruding supporting portion of the bearing site that the supporting structure is part of the track. In this way, an improved utilization of installation space and an improved functional integration is possible.

To further increase the component integration of a window lift assembly, one embodiment is regarded as particularly advantageous, in which a guide rail includes a bearing site of the invention and is integrated in an assembly carrier. In other words, the corresponding guide rail is (integrally) molded with the bearing site to the assembly carrier and is shaped together with the same, respectively. Especially in connection with a manufacture of plastics an extremely inexpensive fabrication can be realized. The attachment of the redirecting element, e.g. a cable pulley or a deflecting piece, then preferably is effected together with the base element described, e.g. a metal bushing or a metal receptacle.

BRIEF DESCRIPTION OF THE DRAWINGS

Further features and advantages of the invention will become apparent from the following description of embodiments with reference to the Figures.

DETAILED DESCRIPTION

Figure 1:
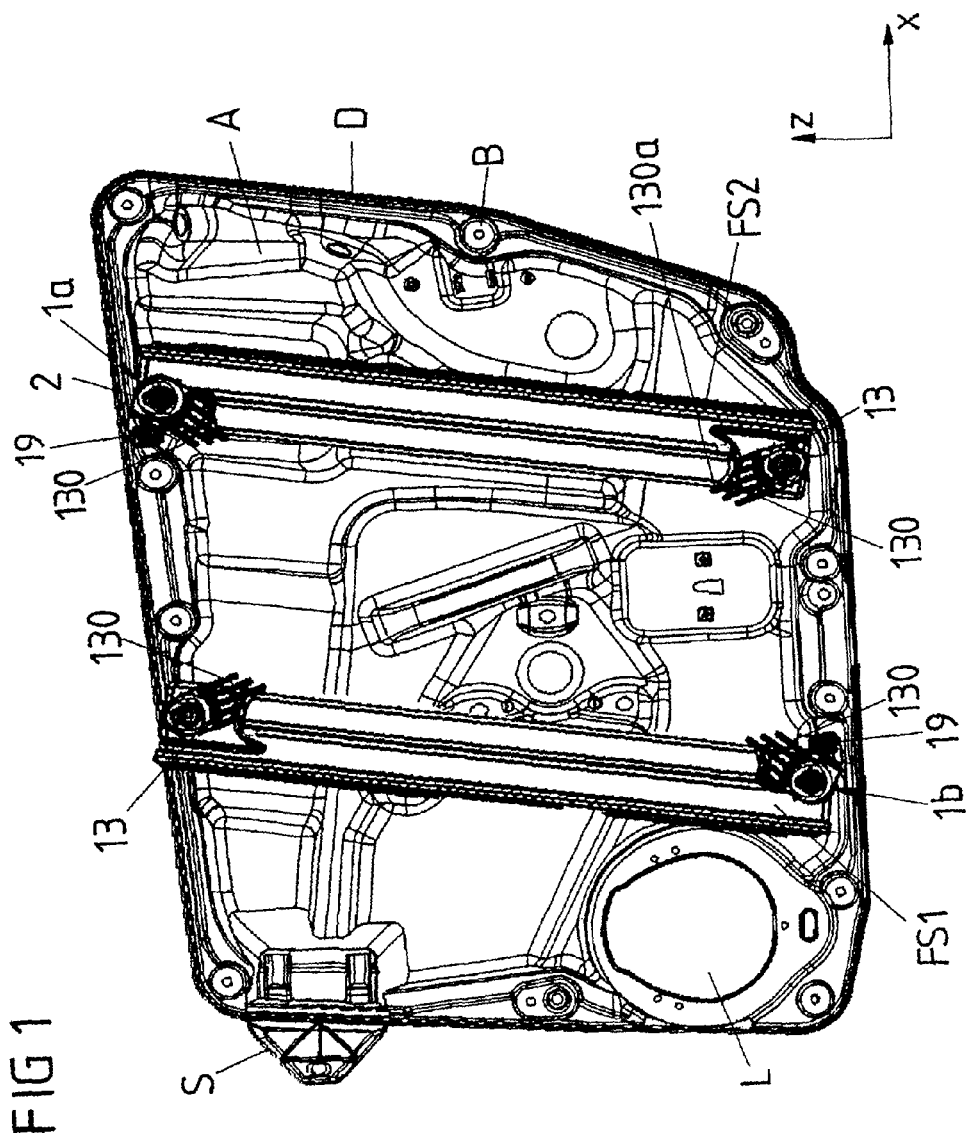
FIG. 1 shows a side view of an assembly carrier of a motor vehicle door with two guide rails.

FIG. 1 shows a side view of a flat assembly carrier A of a motor vehicle door, which on the one hand acts as component of a window lift assembly and on the other hand is formed for carrying further functional components. For this purpose, it includes for example a laterally molded region S for connection of a door lock or a loudspeaker opening L. The assembly carrier A usually is mounted at the motor vehicle door via fastening bores B arranged in the region of its circumference. A seal D extending around the assembly carrier A along its lateral edge ensures a sealed connection after mounting the same on a motor vehicle door.

The illustrated assembly carrier A furthermore includes two guide rails FS1, FS2 oriented parallel to each other. On the assembly carrier A, the guide rails FS1, FS2 extend from a lower end to an upper end slightly inclined with respect to the vertical Z, i.e. in the mounted condition they are slightly inclined with respect to a vehicle axis pointing from the bottom of the vehicle to the top of the vehicle. The guide rails FS1, FS2 substantially extend across the entire width of the flat assembly carrier A in direction of the vertical Z and are spaced from each other and from the edges almost parallel to the vertical Z and laterally defining the assembly carrier A.

At their ends, the guide rails FS1, FS2 each include a cable pulley 2, which serves as redirecting element for a non-illustrated Bowden cable. Via the cable pulleys 2, a driving force transmitted via the Bowden cable is redirected from a drive to a window pane. As a result, the window pane then can be adjusted. i.e. raised and lowered, inside the motor vehicle door by means of the drive.

The four cable pulleys 2, as rotatably mounted redirecting elements, each are arranged and radially supported at the ends of the guide rails FS1, FS2 in a bearing site 1a, 1b. The cable pulleys 2 thus are arranged along a connecting axis Y pointing from the cable pulley 2 to the assembly carrier A or the guide rails FS1, FS2. In other words, mounting the cable pulleys 2 is effected along their axis of rotation vertical to the flat assembly carrier A extending substantially in the XZ-plane. In the present case, supporting the cable pulley 2 each is effected by a supporting portion 13 protruding from the guide rail FS1, FS2 on a region 23 at the circumference of the cable pulleys 2. Therefore, the supporting portion 13 radially supports the cable pulleys 2 substantially in direction of a diagonal, which each points from a cable pulley 2 of a guide rail FS2, FS2 to the diametrically opposed cable pulley 2 of the other guide rail FS2, FS1.

On the supporting portion 13, reinforcing ribs 130 are integrally molded for an improved force absorption of the adjustment forces acting on the cable pulley 2. The same likewise extend in parallel and at a distance from each other in direction of the diametrically opposed cable pulley 2 of the adjacent guide rail FS1, FS2. Since the Bowden cable usually is guided crosswise and is therefore guided e.g. from an upper end of the one guide rail FS1 to a lower end of the other guide rail FS2, the greatest forces also act in this direction during an adjustment of the window pane.

To prevent an unnecessary expenditure of material, the individual reinforcing ribs 130 are designed with different lengths. A central reinforcing rib 130a which is (symmetrically) adjoined by the further reinforcing ribs 130 extends along a straight line, which connects the centers of the diametrically opposed cable pulleys 2, and has the greatest length. Here, the greatest forces each are transmitted from a cable pulley 2 to a protruding supporting portion 13 of the bearing site 1. The further reinforcing ribs 130, which adjoin the central reinforcing rib 130a on both sides, are designed correspondingly shorter and their length depends on the force to be absorbed by or acting on the same.

Furthermore, it can already be seen in FIG. 1 that at least two of the bearing sites 1a, 1b have a Bowden cable or control cable support 19. The Bowden cable support 19 serves the defined guidance of the Bowden cable towards the cable pulley 2 and, upon redirection of the rotary movement of the cable pulley 2, away from the cable pulley 2. For this purpose, the Bowden cable support 19 includes a channel or a groove in which the Bowden or control cable is guided. In the present case, one Bowden cable support 19 each is arranged at the lower end of the first guide rail FS1 and at an upper end of the second guide rail FS2. Here, the Bowden cable support 19 and its (guide) channels, respectively, each point in direction of the opposite lower end of the guide rail FS2 and of the opposite upper end of the guide rail FS1, respectively. Since an optimized supply of a Bowden cable to the cable pulleys 2 should be ensured by means of the illustrated Bowden cable support 19, said cable pulleys extend along a small portion at the bearing site 1b, 1a below the lower end of the guide rail FS1 and above the upper end of the guide rail FS2, respectively.

Figure 2:
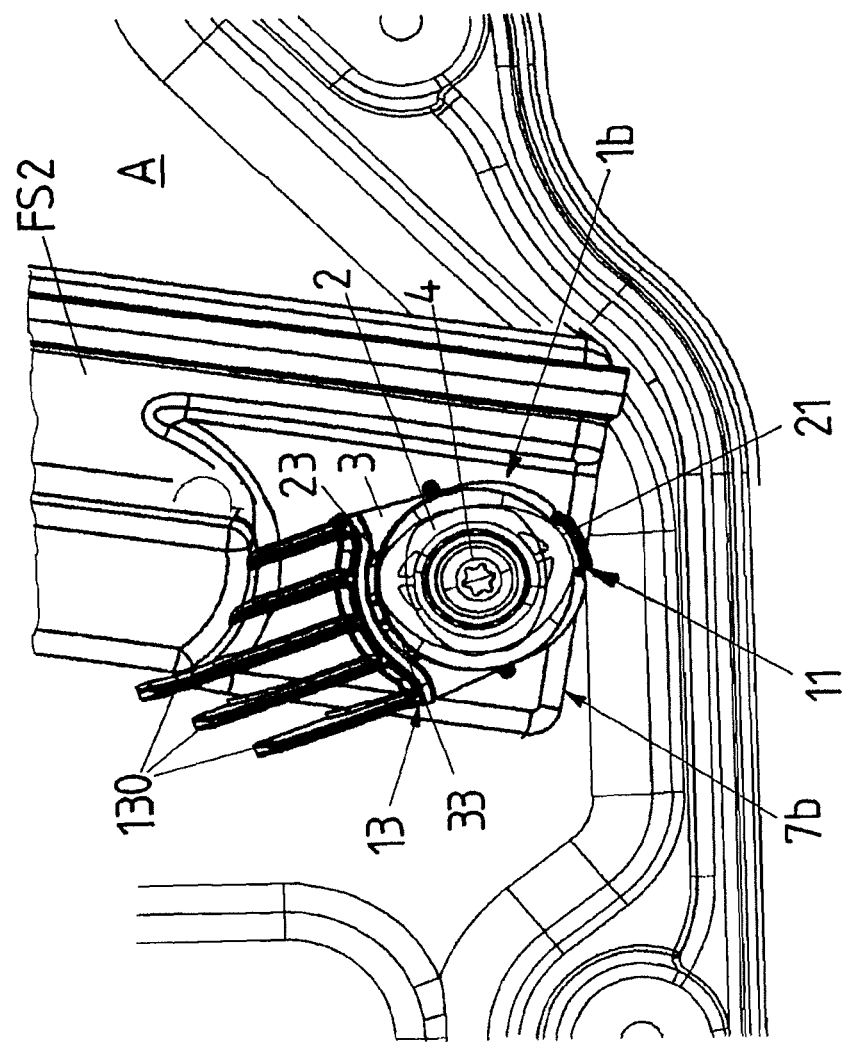
FIG. 2 shows a detailed view of a lower end of a guide rail of FIG. 1.

With the detailed view of the lower end of the guide rail FS2 in FIG. 2, the adapted shape of the (lower) bearing site 1b is illustrated more clearly. Here, it can be seen that the supporting portion 13 of the bearing site 1b, which is formed as supporting region for the cable pulley 2, protrudes substantially vertically from the guide rail FS2. Its (abutment) surface facing the circumference of the cable pulley 2 partly follows the contour of the cable pulley 2 and therefore is curved in the supporting region.

Opposite the supporting portion 13 there is furthermore shown another supporting portion 11 molded to the guide rail FS2. The supporting portion 11 can support the cable pulley 2 on a region 21 of its circumference opposite the supporting portion 13, when e.g. the region 21 of the cable pulley 2 rests against the supporting portion 11. However, to rotatably support the cable pulley 2 with as little friction as possible, a base element is arranged between cable pulley 2 and bearing site 1a, 1b for transmission of the corresponding forces vertical to the rotation and connection axis Y. A direct contact between cable pulley 2 and one of the supporting portions 11, 13 therefore is not necessary.

In the following, the supporting portion 11 also is referred to as "outer supporting portion" for better distinction, since it is located closer to a terminal edge defining the guide rail FS transverse to its direction of extension. In FIG. 2, this is the lower terminal edge 7b. The supporting portion 13 of the bearing sites 1a, 1b correspondingly will also be referred to as "inner supporting portion".

The outer supporting portion 11 likewise extends almost vertically from the guide rail FS2 and is configured as cable protection tab. This means that after the assembly of the cable pulley 2 the outer supporting portion 11 covers a circumferential groove of the cable pulley 2, in which the Bowden cable is guided. In this way, it is prevented that after the assembly the Bowden cable can inadvertently be removed from the guiding groove of the cable pulley 2 in radial and/or axial direction. By means of a force component acting on the cable in Y-direction, i.e. vertical to a driving force, it can thus be prevented that the cable slips away, gets stuck or is even detached from the cable pulley 2 in the region of the bearing sites 1a, 1b.

Furthermore, it is shown in FIG. 2 that in this embodiment the base element 3 is provided, which is arranged between the cable pulley 2 and the bearing site 1b or the guide rail FS2, respectively. The base element 3 includes a base surface 32, which is located almost vertical to the axis of rotation of the cable pulley 2 between a lower surface of the cable pulley 2 and the guide rail FS2. Furthermore, the base element 3 has a portion 33 vertically protruding therefrom, which is located between the inner supporting portion 13 and the region 21 of the cable pulley 2. The cable pulley 2 is connected with the base element 3 or rotatably mounted on the same and hence supports on the bearing site 1b via the base element 3.

Since the cable pulley 2 thus is radially supported and the forces are absorbed by the bearing site 1b in radial direction, a screw 4 introduced along the axis of rotation of the cable pulley 2 together with a washer 5 only is required for axially locking the cable pulley 2 on the guide rail FS2. In addition, e.g. the locking tab, i.e. the outer supporting portion 11, might be designed as resilient latching element, so that the cable pulley 2 or also an alternative redirecting element is retained in the bearing site 1b via a clamping connection. However, to provide a more stable axial locking for a rotatable cable pulley 2 and to more easily minimize the friction by means of an axial locking via a bolt or screw 5, the illustrated configuration variant is preferred.

Figure 3:
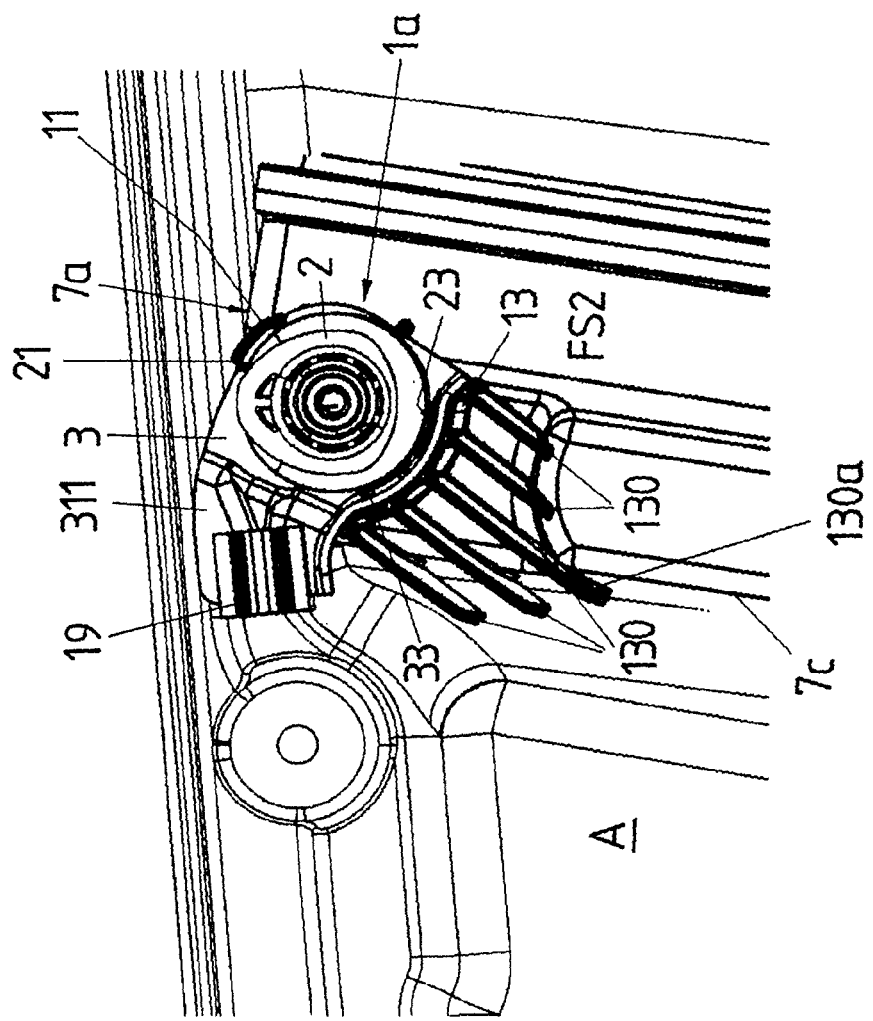
FIG. 3 shows a detailed view of an upper end of the guide rail of FIG. 2.

With FIG. 3, the upper end of the guide rail FS2 from FIG. 1 is shown in an enlarged detailed view. Here as well, a base element 3, preferably made of metal, is used, in order to realize a sandwich construction. With its portion 33 protruding from the guide rail FS2, the base element 3 is arranged between the inner supporting portion 13 of the (upper) bearing site 1a, which is integrally molded to the guide rail FS2, and an edge region 23 of the cable pulley 2 facing this supporting portion 13.

In contrast to the lower bearing site 1b, the base element 3 shown here includes an extension 311 extending beyond the outer edges 7a, 7c rimming the guide rail FS2. The outer edge 7c represents a rim parallel to the direction of extension of the guide rail FS2, while the outer edge 7a extends transverse to the direction of extension. At the region or extension 311a groove is incorporated, which permits the attachment of a Bowden cable support 19 with square base surface. With reference to the base element 3, the Bowden cable support 19 is designed smaller and here does not exceed the diameter of the cable pulley 2. Therefore, the Bowden cable support can easily be mounted as an additional element, possibly of a flexible plastic material, and be preassembled together with the base element 3 and the cable pulley 2. As an alternative, the bearing site 1a itself can of course also include the extension for providing the Bowden cable support 19 and/or the Bowden cable support 19 can also be molded to the guide rail FS2 or to the assembly carrier A.

Figure 4:
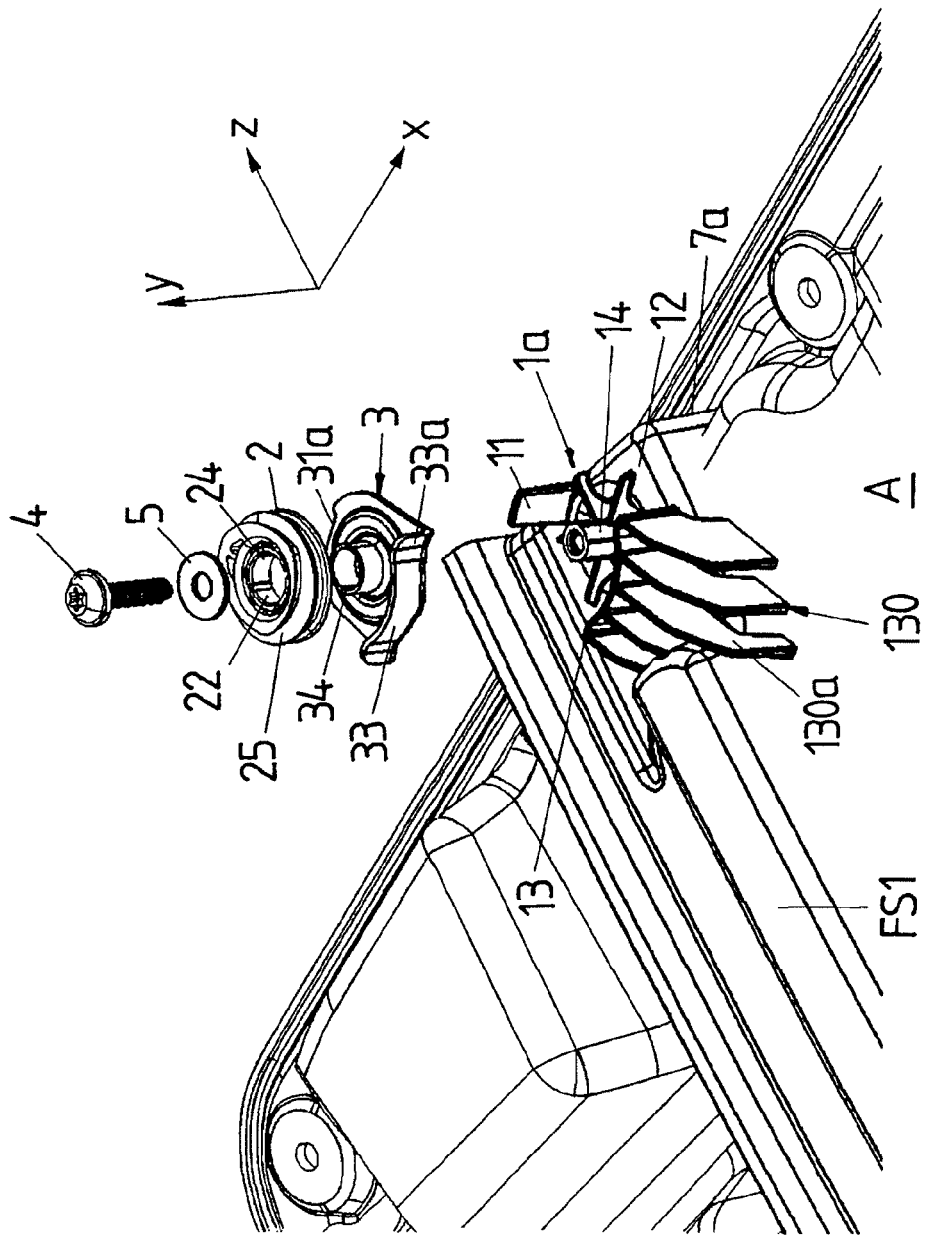
FIG. 4 shows a perspective exploded drawing of an upper end of the second guide rail with a bearing site, a base element, a cable pulley, a washer, and a fastening screw.

In the exploded drawing of FIG. 4, the elements of the window lift assembly are shown individually. For this purpose, the upper bearing site 1a of the guide rail FS1 is shown, which here is integrated, i.e. integrally molded to the assembly carrier A. The flat reinforcing ribs 130, 130a formed vertical to the guide rail FS1 and parallel to the connecting axis Y, respectively, as well as an abutment surface 12 of the bearing site 1a likewise are shown here. After the assembly, the base element 3 rests against the abutment surface 12 with the bottom side of the base surface 32 in direction of the guide rail FS1 (FS2).

In this representation it can also be seen that the bearing site 1a centrally includes a protruding hollow bearing or fastening pin 14. An eyelet 34 at the base element 3 can be guided over the same, so that a simplified and defined positioning of the base element 3 is possible. Due to the inventive radial support of the cable pulley 2 or of the base element 3, the sleeve-shaped bearing pin 14 absorbs the radial forces acting on the cable pulley 2, with the base element 3 then being radially supported on the supporting portions 11 and 13 of the bearing site 1a, 1b. To allow a correspondingly thin-walled design of the bearing pin, making the base element of a dimensionally stable metal is recommendable, whereas the bearing sites 1a and 1b can be made of plastics.

In its interior an internal thread is provided, so that after putting the circular eyelet 34 over them, the base element 3 and the cable pulley 2 can quickly and easily be mounted on the guide rail FS1 in an axially secured manner by means of a washer 5 and a screw 4. The screw 4 together with the washer 5 only provides an axial locking. Via the inner surface 22 of its bore 24 the cable pulley 2 is radially supported on the outer surface of the eyelet 34 of the base element 3, and via its protrusion or protruding portion 33 on the inner supporting portion 13 of the bearing site 1a. Via the eyelet 34 of the base element 3, the cable pulley 2 thus is rotatably mounted.

Mounting the cable pulley 2 and the base element 3 on the bearing site 1a or the guide rail FS can be effected jointly or one after the other. What is decisive is the modular construction of the functional components consisting of cable pulley 2, base element 3 and bearing site 1a.

FIG. 4 also clearly shows how the rotation of the base element 3 along with the cable pulley 2 is prevented with the illustrated embodiment in an appealing manner. For this purpose, the base element 3 includes a cutout or recess 31a, which positively encloses the outer supporting portion 11 when the base element 3 has been introduced into the bearing site 1a in the specified manner. In addition, the curved portion 33 of the base element 3 is provided with an adjoining extension 33a on both sides, which forms an abutment in the case of an attempted rotary movement of the base element 3. For this purpose, the extension 33a has a curvature opposite to the curvature which follows the contour of the cable pulley 2, via which the extension 33a produces a fit with the outer supporting portion 13 of the bearing site 1a and additionally prevents a rotation of the base element 3. Instead of an opposite curvature, this could of course also be realized by a bent extension 33a or by an extension 33a generally extending radially with respect to the cable pulley 2.

If the bearing site 1a is configured as a receptacle which at least partly surrounds the cable pulley 2, regions not used for supporting the cable pulley 2, but surrounding the cable pulley 2, can of course also be utilized for such locking of the base element 3.

FIGS. 5A and 5B again show individual views of the base element 3, the cable pulley 2 with a circumferential groove 20 for guiding a Bowden cable, the washer 5 and the screw 4, in order to more clearly illustrate their assembly and their engagement in each other.

Figure 5A:
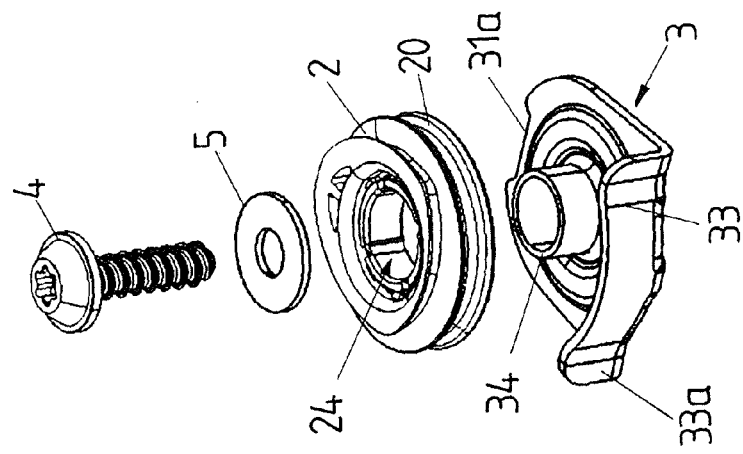
FIG. 5A shows a perspective exploded drawing of the components of FIG. 4 without guide rail.

In the perspective view of FIG. 5A, a recess 26 formed around the bottom side of the cable pulley 2 can be seen. The bottom side of the cable pulley 2 faces the base surface of the base element 3, so that a circumferential annular bead 36 of the base element 3 can protrude into the recess 26. In this way, a defined abutment of the cable pulley 2 against the base element 3 and a reinforcement of the base element 3 is achieved.

Figure 5B:
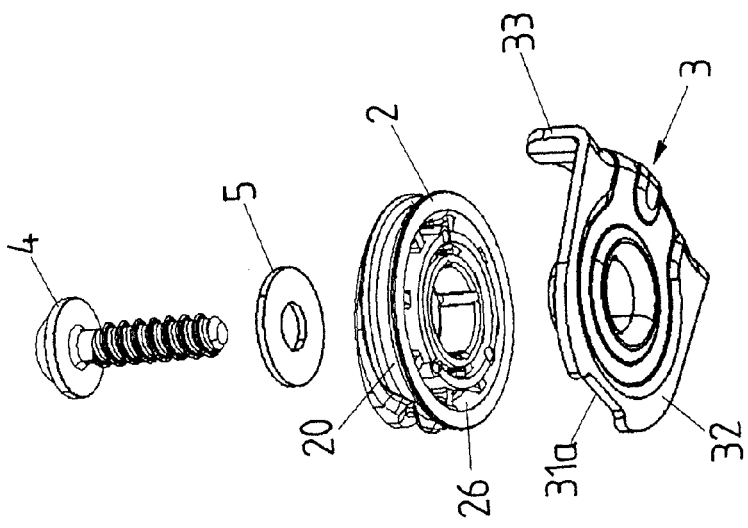
FIG. 5B shows a perspective exploded drawing of the components of FIG. 4 without guide rail.
Figure 6A:
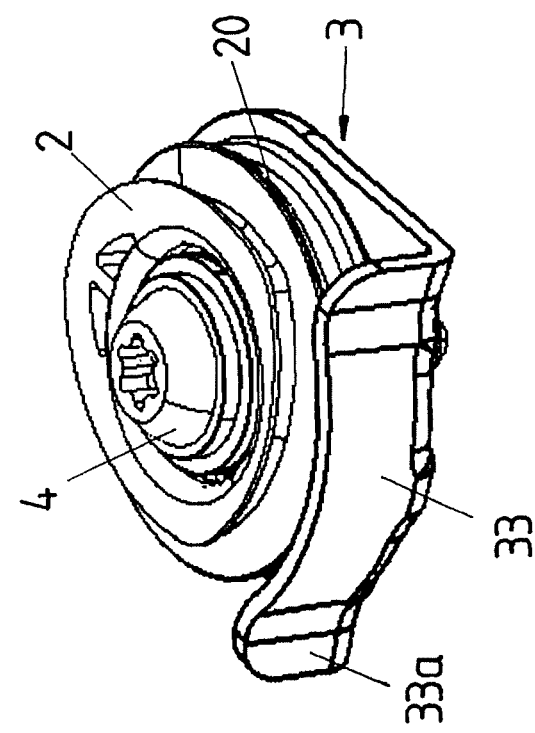
FIG. 6A shows a corresponding perspective view of the components of FIGS. 5A-B in the assembled condition.
Figure 6B:
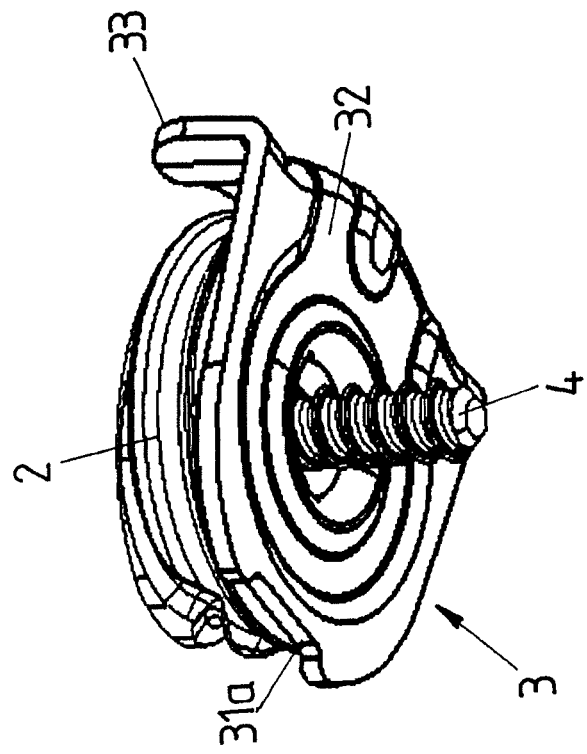
FIG. 6B shows a corresponding perspective view of the components of FIGS. 5A-B in the assembled condition.

In FIGS. 6A and 6B an assembled configuration of the elements from FIGS. 5A and 5B is shown in corresponding views. With such a preassembled assembly consisting of base element 3, cable pulley 2 and screw 4 put through them both, a fast and almost error-free connection to the guide rail FS1, FS2 or to the assembly carrier A is possible. Together with the corresponding bearing site 1a, 1b a stable circumferential support of the cable pulley 2 is ensured, without a massively designed bearing pin having to support the cable pulley 2 and having to absorb the bending moments acting on the screw 4.

Figure 7:
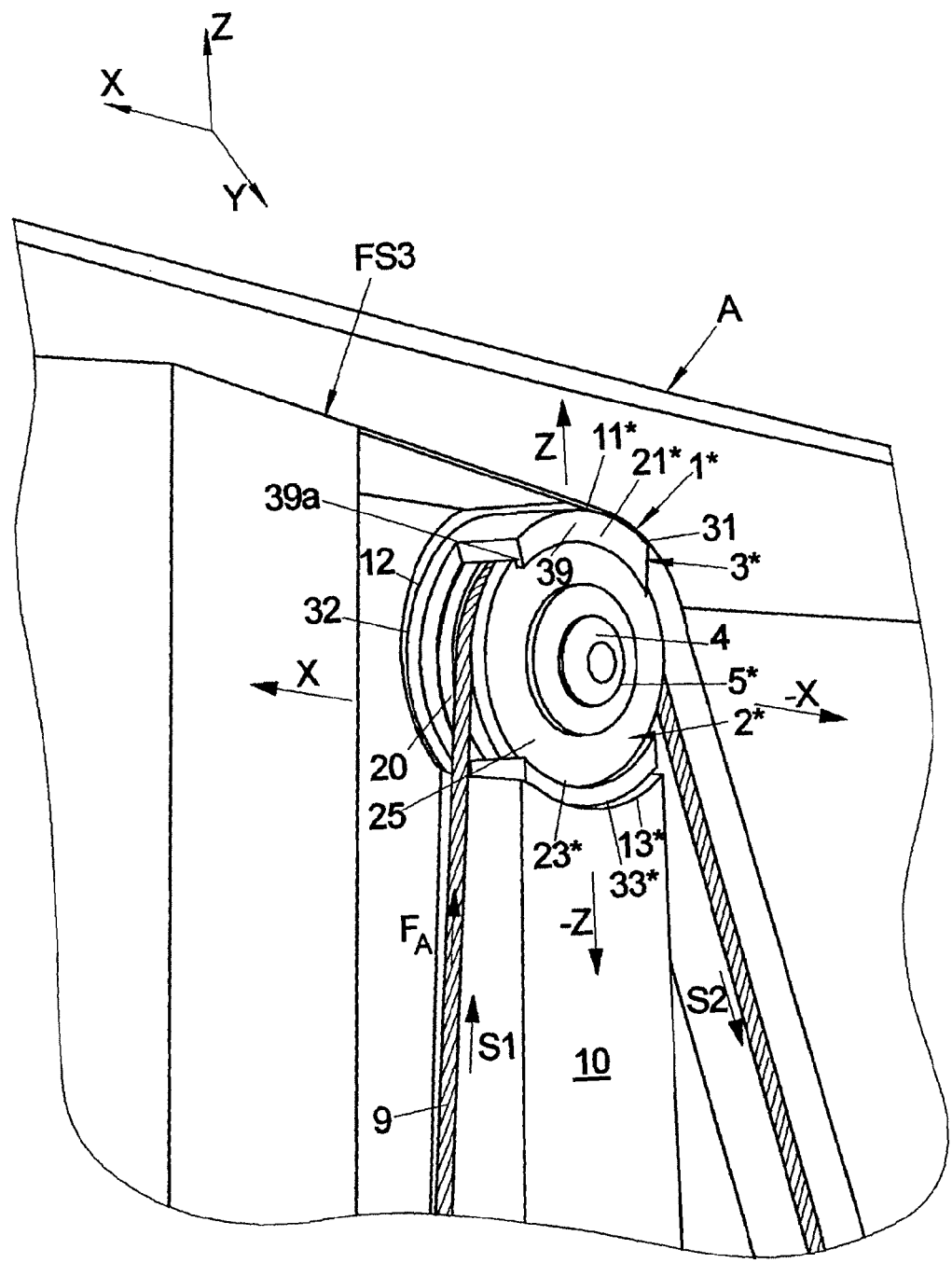
FIG. 7 shows a further embodiment in a perspective side view of an upper end of a guide rail.

With FIG. 7 an alternative embodiment of a bearing site 1* is shown. Correspondingly, the bearing site 1* initially is provided here for a cable pulley 2* on a guide rail FS3 extending along the assembly carrier A. In contrast to the preceding explanations, however, the bearing site 1* now is partly "enclosed" by the guide rail FS3. This means that the terminal edge 7a defining the guide rail FS3 to the top, i.e. transverse to its direction of extension, at the same time forms a radial support of the cable pulley 2*. For this purpose, the terminal edge 7a forms the supporting portion 11* protruding parallel to the axis of rotation or to the connecting axis Y, or a supporting region which supports the cable pulley 2* by means of an alternatively configured base element 3* in a region 21* of its outer circumference at least in direction Z vertical to the connecting axis Y. In FIG. 7, the Z-direction likewise is the direction of extension of the guide rail FS3.

Furthermore, the guide rail FS3 opposite to the supporting portion 11* likewise forms a further bearing site portion 13* supporting the cable pulley 2*. This likewise protruding supporting portion 13* of the bearing site 1* supports the cable pulley 2* in a region 23* on the outside or on the circumference of the cable pulley 2*, which is located opposite the region 21*.

The two portions 11* and 13* each form curved abutment surfaces following the circular contour of the cable pulley 2*, which each extend over the entire thickness of the cable pulley 2*. In other words, the abutment surfaces of the supporting portions 11* and 13* just as the supporting portions 11 and 13 of FIGS. 1-4 extend axially (in direction of the connecting axis Y) at least up to an upper side 25 of the cable pulley 2* or 2 facing away from the assembly carrier A. Due to the fact that the supporting portions 11* and 13* each cover at least one quarter of the circumference of the cable pulley 2*, they also provide a support against force components which act in direction X and –X vertical to the connecting axis Y and vertical to the extension Z or –Z of the guide rail FS3.

In the illustrated embodiment of FIG. 7, the supporting "inner" supporting portion 13* is not adjoined by any reinforcing ribs, but by a supporting structure 10. This supporting structure 10 preferably is an integrally molded hollow section extending from the abutment surface of the supporting portion 13*. In the present case, the same extends in direction –Z. In this way, a force acting on the supporting portion 13* is selectively introduced and transmitted to the guide rail FS3 and the screw 4 centrally introduced into the cable pulley 2* again only serves for axially locking the cable pulley 2* in direction of the connecting axis Y. For an improved functional integration, the supporting structure 10 can be part of a track of the guide rail FS3, along which a carrier can be shifted, in order to adjust a window pane (not shown) connected with the carrier.

In this way, an effective absorption of those forces is possible which substantially act onto the cable pulley 2* via a Bowden cable 9 guided in the groove 20 of the cable pulley 2*. For transmitting the driving force $F_A$ from a drive to a window pane to be adjusted (not shown), the cable pulley 2* redirects the Bowden cable 9 or the driving force $F_A$ into another direction of action S1 or vice versa, depending on the direction of rotation. In the illustrated representation, a portion of the window pane or a carrier connected therewith would be moved in S1-direction by means of the Bowden cable 9, in that the driving force $F_A$ acting in S2-direction is redirected via the cable pulley 2*.

Since, as shown in FIG. 7, the one direction of action S1 extends almost parallel to the direction of extension Z and the other direction of action S2 only includes components in direction –X and –Z, the support of the cable pulley 2* by the supporting portions 11* and 13* also ensures a stable absorption of the forces thereby acting onto the cable pulley 2* in these directions. Alternatively, a separate supporting portion each can also be provided for the separate support in the respective directions (of maximum load) S1, S2 and –Z.

Furthermore, FIG. 7 shows an alternative embodiment of a base element 3*, which here is arranged with two portions 31 and 33* protruding from the base surface 32 between the cable pulley 2* and the supporting portions 11* and 13*. In the present case, the portions 31 and 33* therefore form a Bowden cable protection, in that they cover the groove 20 extending around the cable pulley 2* for guiding the Bowden cable 9 at a distance which does not exceed the thickness of the Bowden cable 9. After assembly, the Bowden cable therefore can no longer slip out of the groove 20 uncontrolled.

In addition, the portion 31 of the base element 3* includes a (narrow) edge or protrusion 39 radially extending towards the center of the cable pulley 2*. The same forms a stop surface 39a facing the upper side 25 of the cable pulley 2*, which prevents the cable pulley 2* from being tilted by a force component acting vertical to the driving force $F_A$, e.g. parallel to the Y-direction. Thus, tilting of the cable pulley 2* about an axis vertical to the axis of rotation or the connecting axis Y is prevented or at least permitted to an extent which depends on the distance of the upper side 25 to the stop surface 39a of the protrusion 39. The integrally molded protrusion 39 is designed correspondingly narrow, so that the cable pulley 2* can still be introduced into the base element 3* at an angle for attachment.

Figure 8:
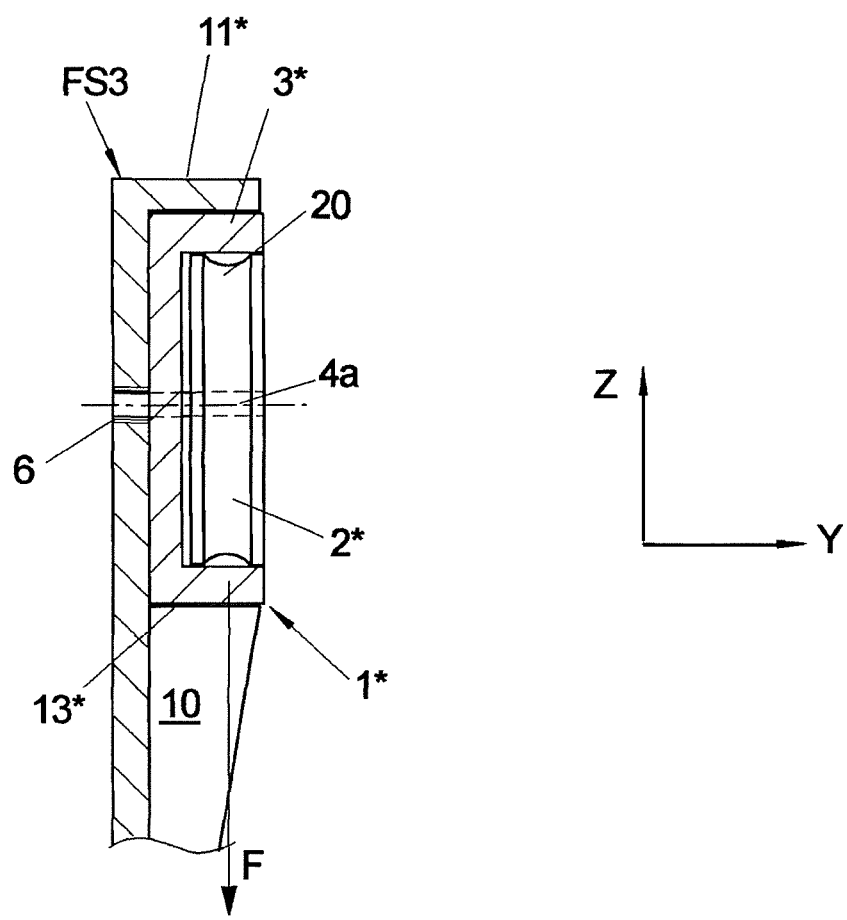
FIG. 8 shows a sectional top view of the embodiment of FIG. 7.

In a sectional side view, FIG. 8 shows the preceding embodiment without the protrusion 39 at the base element 3*. A fastening bore 6 at the guide rail FS3 for the screw 4 here is only shown schematically. On the other hand, FIG. 8 shows that the integrally molded supporting structure 10 conically tapers from the cable pulley 2* or the supporting portion 13 in direction −Z and hence has a shape adapted to the flux of force. As can be taken from a synopsis with FIG. 7, a resultant force F always acts in direction −Z as a result of the redirection of the driving force $F_A$ to the cable pulley 2* or the screw 4. With an exclusively central support of the cable pulley 2* via the screw 4, the force (component) F acting on the cable pulley 2* in direction −Z therefore leads to a high bending moment, which must be absorbed for example via a correspondingly massive plastic dome. The supporting portions 11* and 13*, on the other hand, absorb the resultant force F responsible for this directly at the circumference of the cable pulley 2*. Via the supporting structure 10, the force F is introduced from the supporting portions 11* and 13* into the guide rail FS3. Due to the conical course of the supporting structure 10, a rather optimal introduction and distribution of force is effected in the guide rail FS3.

Figure 9:
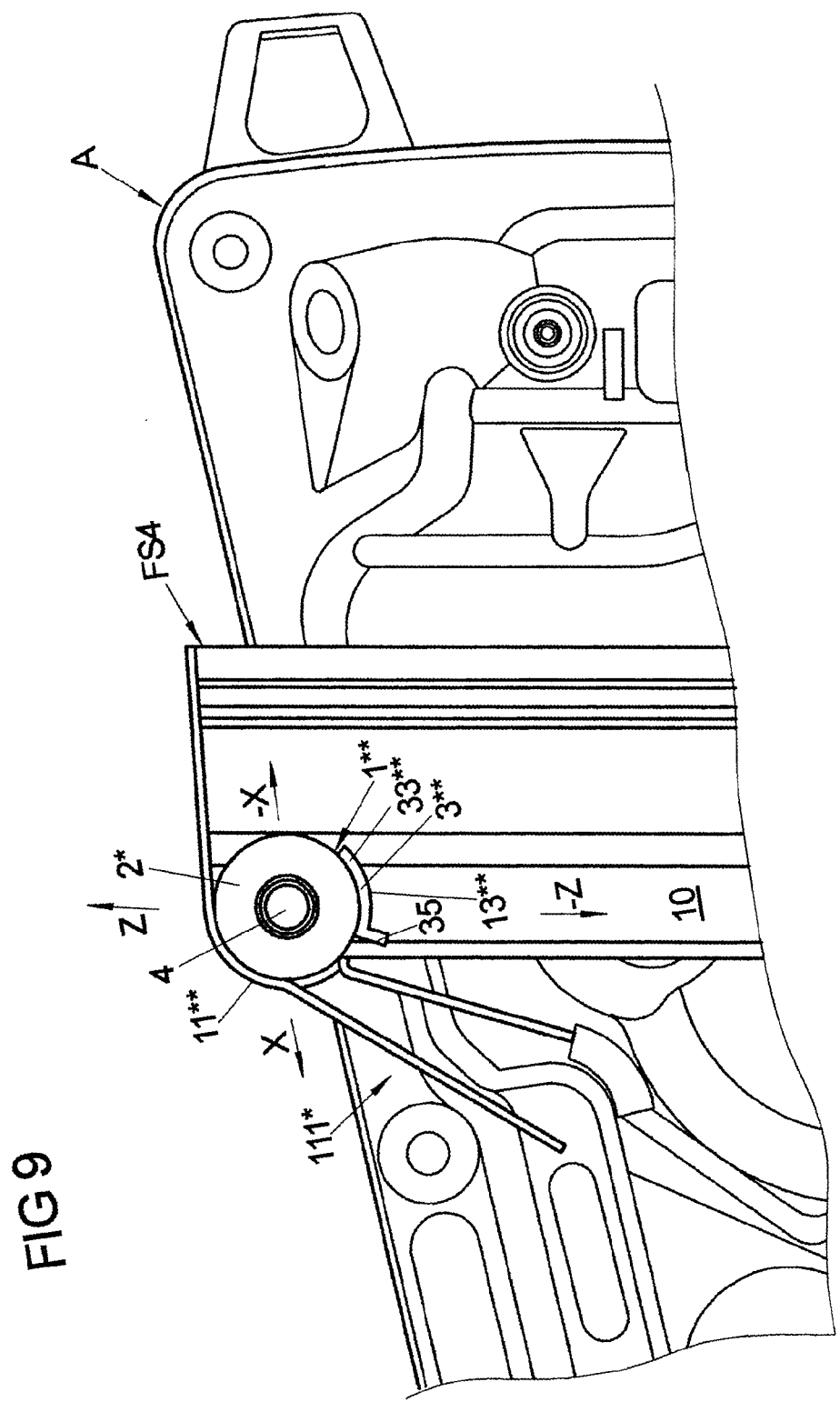
FIG. 9 shows a side view of a further embodiment.

With FIG. 9 a guide rail FS4 is shown, which likewise has a bearing site 1 with correspondingly arranged supporting portions 11 and 13** and a supporting structure 10. What is alternatively configured here chiefly is the region 111* for a Bowden cable guide adjoining the supporting portion 11 and the supporting portion 13. For this purpose, the region 111* for the Bowden cable guide is limited by two narrow webs which substantially define a V-shaped region narrowing towards the cable pulley 2*. Especially when manufacturing the guide rail FS4 of plastics, these webs can be integrally molded as extensions of the supporting portions 11 and 13 in an inexpensive manner and allow a more defined supply of a Bowden cable to the cable pulley 2*.

Figure 10:
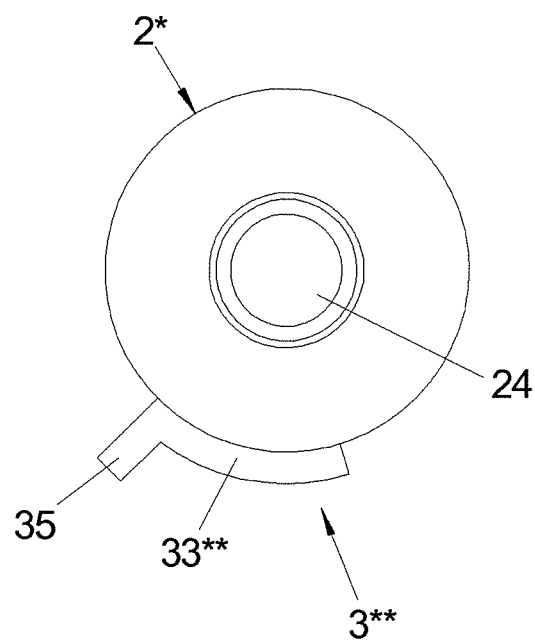
FIG. 10 shows an individual representation of a cable pulley with a base element with anti-rotation device in a side view.

Furthermore, a synopsis of FIG. 9 with FIG. 10 also shows an alternative embodiment of the base element 3 incorporated in the bearing site 1. The base element 3 only includes a portion 33 protruding from the base surface 32. The protruding portion 33 is arranged between the supporting structure 10 of the bearing site 1 and a circumferential region of the cable pulley 2*, in order to support the cable pulley 2* substantially in direction −Z. To prevent the base element 3** from rotating along with the rotatably mounted cable pulley 2* in a simple manner, the base element 3** includes an integrally molded web 35 as an anti-rotation device. This web 35 extends substantially vertical to the axis of rotation of the cable pulley 2* (radial to the cable pulley 2*) on the base element 3 or on the portion 33 of the base element 3 and is fixed in the region of the bearing site 1. As shown in FIG. 9, the web 35 is positively accommodated in a recess of the supporting structure 10.

In contrast to the illustrated configuration variants, the direct abutment of the regions 21, 23 or 21*, 23* of the cable pulley 2 or 2* against the base element 3 or 3* or against the supporting portions of the bearing site is possible. For this purpose, the corresponding regions might be formed in the sense of plain bearing portions radially supporting the cable pulley. A low-friction rotation of the cable pulley would thus be permitted, although regions of the cable pulley "rest against" the supporting portions.

Although in the preceding embodiments a cable pulley 2 or 2* each has been represented as redirecting element, an alternative redirecting element can of course also be provided, which usually is employed in a window lift assembly of a motor vehicle door. This can for example also be a (rigid) deflecting piece or a deflecting slide through which a Bowden cable is guided. In such an immovably fixed redirecting element, regions of the deflecting piece preferably directly rest against the supporting portions of the bearing site and of the base element as set forth above vertical to the connecting axis.

It is also possible to manufacture said components (guide rail, assembly carrier, bearing site, base element, cable pulley, etc.) of different materials or of the same material, such as plastics or a metal, and to combine the illustrated configuration variants with each other.

The invention claimed is:

1. A window lift assembly for a motor vehicle comprising a component on which a bearing site is provided for a redirecting element, in particular for a cable pulley or a deflecting piece,
   wherein the redirecting element is arranged on the component at the bearing site along a connecting axis extending in a direction from the redirecting element to the component and the redirecting element redirects a driving force for adjusting a window pane of the motor vehicle,
   wherein the redirecting element is mounted on the component along the connecting axis and the connecting axis forms a physical axis for mounting the redirecting element, and
   wherein the bearing site supports the redirecting element on an outer surface of the redirecting element that rims the redirecting element, the bearing site supporting the redirecting element at least in a direction perpendicular to the connecting axis, and wherein the bearing site includes a protruding portion supporting the redirecting element in a direction perpendicular to the connecting axis, wherein the protruding portion protrudes from the component and comprises an abutment surface supporting the redirecting element,
   wherein the window lift assembly further comprises a base element separately mountable to the bearing site, which with at least one portion is located between the redirecting element and the protruding portion of the bearing site and via which the redirecting element supports on the bearing site perpendicular to the connecting axis, so that forces acting on the redirecting element due to the redirection of the driving force are transmitted from the base element to the protruding portion at its the abutment surface.

2. The window lift assembly according to claim 1, wherein the bearing site supports the redirecting element at least in a direction in which a resultant force acts on the redirecting element due to the redirection of the driving force.

3. The window lift assembly according to claim 1, wherein the bearing site is formed as receptacle which at least partly surrounds the redirecting element.

4. The window lift assembly according to claim 1, further comprising a supporting structure which extends from the abutment surface, which the bearing site forms at the at least one protruding portion and on which the redirecting element is supported, or from the at least one protruding portion in a direction which points away from the redirecting element.

5. The window lift assembly according to claim 4, wherein the supporting structure conically tapers from the abutment surface or the protruding portion.

6. The window lift assembly according to claim 1, wherein the bearing site supports at least one of the redirecting element and the base element such that the bearing site limits or prevents tilting of the at least one of the redirecting element and the base element in a direction parallel to the connecting axis.

7. The window lift assembly according to claim 6, wherein the at least one protruding portion of the bearing site encloses at least one of the redirecting element and the base element.

8. The window lift assembly according to claim 7, wherein the portion of the bearing site enclosing at least one of the redirecting element and the base element includes a stop surface which prevents the redirecting element from being tilted by a force component acting vertical to the driving force.

9. The window lift assembly according to claim 1, wherein a portion of the base element enclosing the redirecting element includes a stop surface which limits or prevents tilting of the redirecting element by a force component acting vertical to the driving force.

10. The window lift assembly according to claim 1, wherein the base element is formed and provided to be mounted at the bearing site together with the redirecting element.

11. The window lift assembly according to claim 1, wherein the base element includes an anti-rotation device, by means of which it is prevented in a redirecting element rotatably mounted for redirecting the driving force that the base element is rotated along with a rotation of the redirecting element.

12. The window lift assembly according to claim 11, wherein the base element includes an integrally molded web as anti-rotation device, which extends at the base element substantially vertical to an axis of rotation of the redirecting element and which is fixed in the region of the bearing site.

13. The window lift assembly according to claim 1, wherein the redirecting element includes a Bowden cable as flexible pulling means, via which the driving force acts, and the bearing site includes a Bowden cable support which guides the Bowden cable towards the redirecting element or away from the redirecting element.

14. The window lift assembly according to claim 13, wherein the Bowden cable support can be attached to a region of the bearing site or of the base element, which is provided for this purpose.

15. The window lift assembly according to claim 1, wherein the bearing site includes a protruding hollow fastening pin and the base element includes an eyelet for mounting the redirecting element, which is put over the fastening pin, and that a fastening element is connected with the hollow fastening pin, so that the redirecting element and the base element are locked by the fastening element in direction of the connecting axis.

16. The window lift assembly according to claim 1, wherein the bearing site includes at least one reinforcing rib.

17. The window lift assembly according to claim 16, wherein the reinforcing rib is molded to the at least one protruding portion.

18. The window lift assembly according to claim 16, wherein the reinforcing rib or a plurality of reinforcing ribs extends in a direction of action of the driving force.

19. The window lift assembly according to claim 4, wherein the supporting structure of the bearing site is part of a track of a guide rail along which a carrier can be shifted, in order to adjust the window pane connected with the carrier.

20. A guide rail as component of a window lift assembly for a motor vehicle, wherein the guide rail includes a redirecting element which redirects a driving force acting via a Bowden cable, in order to adjust a window pane of the motor vehicle, comprising a bearing site and a base element according to claim 1.

21. The guide rail according to claim 20, wherein the guide rail is molded to an assembly carrier of a motor vehicle door.

22. A window lift assembly for a motor vehicle, with a component on which a bearing site is provided for a redirecting element, in particular for a cable pulley or a deflecting piece,
wherein the redirecting element is arranged on the component at the bearing site along a connecting axis pointing from the redirecting element to the component and the redirecting element redirects a driving force for adjusting a window pane of the motor vehicle,
wherein the redirecting element is mounted on the component along the connecting axis and the connecting axis forms a physical axis for mounting the redirecting element, and
wherein the bearing site supports the redirecting element on an outer surface of the redirecting element that rims the redirecting element, the bearing site supporting the redirecting element at least in a direction perpendicular to the connecting axis, and wherein the bearing site includes a protruding portion for supporting the redirecting element in a direction perpendicular to the connecting axis which protruding portion protrudes from the component and comprises an abutment surface supporting the redirecting element,
wherein the bearing site includes a supporting structure which extends from the abutment surface of the at least one protruding portion in the perpendicular direction pointing away from the redirecting element and which is part of a track of a guide rail along which a carrier can be shifted, in order to adjust the window pane connected with the carrier,
wherein the window lift assembly further comprises a base element separately mountable to the bearing site, wherein at least a portion of the base element is located between the redirecting element and the abutment surface of the protruding portion of the bearing site.

23. A window lift assembly for a motor vehicle, with a component on which a bearing site is provided for a redirecting element, in particular for a cable pulley or a deflecting piece,
wherein the redirecting element is arranged on the component at the bearing site along a connecting axis pointing from the redirecting element to the component and the redirecting element redirects a driving force for adjusting a window pane of the motor vehicle,
wherein the redirecting element is mounted on the component along the connecting axis and the connecting axis forms a physical axis for mounting the redirecting element, and
the bearing site supports the redirecting element on an outer surface of the redirecting element that rims the redirecting element, the bearing site supporting the redirecting element at least in a direction perpendicular to the connecting axis, and the bearing site includes a protruding portion for supporting the redirecting element in a direction perpendicular to the connecting axis which the protruding portion protrudes from the component and comprises an abutment surface for the support of the redirecting element,
wherein the bearing site includes a protruding hollow fastening pin and
wherein a base element separately mountable to the bearing site is provided, wherein at least a portion of the base element is located between the redirecting element and the protruding portion of the bearing site, the base element including an eyelet for mounting the redirecting element, wherein the eyelet is put over the fastening pin and a fastening element is inserted in the protruding hollow fastening pin, so that the redirecting element and the base element are locked by the fastening element in direction of the connecting axis.

24. The window lift assembly according to claim 1, wherein the base element and the bearing site are made of different materials.

* * * * *